United States Patent [19]

Oyama et al.

[11] Patent Number: 4,682,182

[45] Date of Patent: Jul. 21, 1987

[54] MARKING DEVICE FOR PIPE

[75] Inventors: Akihiro Oyama, Yokosuka; Yutaka Funyu; Kazuyuki Sakurada, both of Handa, all of Japan

[73] Assignee: Kawasaki Steel Corporation, Tokyo, Japan

[21] Appl. No.: 805,341

[22] Filed: Dec. 4, 1985

[30] Foreign Application Priority Data

Dec. 4, 1984 [JP] Japan .................. 59-255101

[51] Int. Cl.$^4$ ............................. G01D 15/16
[52] U.S. Cl. ........................ 346/1.1; 101/35; 118/317; 346/33 R; 346/75; 400/126; 901/43
[58] Field of Search ............... 346/75, 140, 1.1, 33 R; 101/35; 118/317, 323; 901/43, 41, 6; 400/126

[56] References Cited

U.S. PATENT DOCUMENTS

| 3,606,162 | 9/1971 | Lehmann | 118/323 X |
| 3,867,882 | 2/1975 | Ahlgren | 101/35 |
| 3,960,072 | 6/1976 | Ahlgren | 101/35 |
| 4,029,006 | 6/1977 | Mercer | 101/35 |
| 4,348,731 | 9/1982 | Kogawa | 901/43 X |
| 4,353,677 | 10/1982 | Susnjara | 901/43 X |
| 4,591,281 | 5/1986 | Howard | 346/75 X |

FOREIGN PATENT DOCUMENTS 58-128658 8/1983 Japan .
58-145734 9/1983 Japan .
59-67241 5/1984 Japan .

Primary Examiner—Joseph W. Hartary
Attorney, Agent, or Firm—Austin R. Miller

[57] ABSTRACT

A marking device comprises a movable arm having a working end carrying a marking tool, such as a marking head. A controller is associated with the movable arm and so programmed as to axially move the marking tool to a desired axial position opposing the inner or outer surface of the pipe and to circumferentially move the marking tool along the surface while applying a preset mark to the corresponding surface of the pipe.

28 Claims, 11 Drawing Figures

MARKING DEVICE FOR PIPE

BACKGROUND OF THE INVENTION

The present invention relates generally to a novel marking device which can mark the inner and/or outer surface of a pipe, such as a steel pipe, plastic pipe, concrete pipe and so forth. More specifically, the invention relates to an automatical marking device which automatically positions a marking tool and applies a mark to a predetermined point on the inner and/or outer surface of the pipe.

In pipe industries, the type, size and usage of the pipes have to be indicated thereon. Conventional marking devices for labelling the type, size and usage have not been effective at all. Therefore, an effective device is required.

In particular, in the prior art, a difficulty is encountered when the inner surface of the pipe is to be marked, as marking tools have not previously been applicable to marking the inner surface of a pipe.

On the other hand, in the recent years, robots suitable for various functions have been developed and put into use on various industrial lines. Such industrial robots are known to be efficient at accurately repeating predetermined operations. In general, robots operations include positioning of machine tools to predetermined work positions and performing required operations at those work positions.

Therefore, by combining known marking tools and industrial robots, pipes can be labelled to indicate type, size, usage and so forth automatically and with high positional accuracy even when the marking has to be put on the inner surface of the pipe. The invention uses this concept to provide an efficient and accurate novel marking device suitable for marking the inner and/or outer surfaces of pipes.

SUMMARY OF THE INVENTION

Therefore, it is an object of the present invention to provide a novel marking device which is capable of automatically marking pipes, even on their inner surfaces.

Another and more specific object of the present invention is to provide a marking device incorporating a robot carrying a marking tool, which can be controlled to automatically position the marking tool at a predetermined marking position.

In order to accomplish the above-mentioned and other objects, a marking device comprises a movable arm having a working end carrying a marking tool, such as a marking head. A controller is associated with the movable arm and so programmed as to axially move the marking tool to a desired axial position opposing the inner or outer surface of the pipe and then circumferentially move the marking tool so as to apply a preset mark to the corresponding surface of the pipe.

In preferred construction, the controller controls the movable arm to maintain a predetermined space between the marking tool and the corresponding surface of the pipe, which space is suitable for the marking operation.

According to one aspect of the invention, a method for applying marks to the surface of a hollow product with a constant radius of curvature, comprising the steps of:

mounting marking head on the motile end of a multi-axis movable arm assembly;

causing a first movement of the movable arm assembly carrying the marking head from a predetermined initial position toward the product;

detecting a reference position of the product during the first movement of the movable arm assembly;

deriving the position of the reference position of the product relative to the initial position;

deriving a marking start position on the basis of the derived reference position and a preset distance from the reference position of the product;

causing a second movement of the movable arm to carry the marking heat to the marking start position;

deriving a path through which to move the marking head on the basis of the marking start position and preset offsets from the marking start position, the path including a marking end position;

causing a third movement to move the marking head along the path;

activating the marking head to perform a marking operation in synchronism with the third movement;

detecting when the marking head reaches the marking end position and then stopping the third movement; and causing a fourth movement of the movable arm to return the marking head to the initial position.

According to another aspect of the invention, a process for applying a mark to a surface of a product comprising the steps of:

installing a marking tool including a marking head on a movable arm of an industrial robot;

causing a first movement of the movable arm from a predetermined initial position separated from the product to be marked, the first movement of the movable arm including a period in which the marking tool moves toward the product along an axis parallel to the surface of the product on which a marking start position lies;

detecting reference position of the product;

deriving a desired terminal position of the first movement opposing the marking start position relative to the position of the reference position of the product;

stopping the first movement of the movable arm upon reaching the derived terminal position and holding the marking tool in opposition to the marking start position at a predetermined distance from the surface of the product;

deriving the path of a second movement of the movable arm in which the marking tool moves along the surface of the product on the basis of the terminal position of the first movement, which path includes a position at which a marking operation ends;

causing the second movement of the movable arm;

activating the marking tool to perform a marking operation in synchronism with the second movement of the movable arm;

detecting the movable arm reaches the marking end position and then stopping the second movement; and causing a third movement by which the movable arm is returned to the initial position.

The process further comprises a step of providing a sensor for detecting the reference position of the product in such a manner that the sensor is positioned away from the marking tool, the distance between the sensor and the marking tool substantially corresponding to the predetermined distance between the reference position of the product and the marking start position.

The marking operation as set forth above applies a mark to the inner surface of a hollow product. The hollow product is a cylindrical pipe.

The step of deriving the path for the second movement includes the step of deriving the position of at least one intermediate point between the marking start position and the marking end position. The step of deriving the path for the second movement includes the step of deriving the positions of a plurality of points between the marking start position and the intermediate point and between the intermediate point and the marking end position.

The path is so selected as to cause the second movement substantially follow the surface of the cylindrical pipe within a plane perpendicular to the longitudinal axis of the pipe. The path is essentially semi-circular. The intermediate point is preselected by presetting vertical and horizontal offsets from the marking start position. Also, the marking end position is preselected by presetting vertical and horizontal offsets from the marking start position. In the alternative, the end position is preselected by presetting vertical and horizontal offsets from the intermediate point.

According a further aspect of the invention, a device for applying marks to a surface of a hollow product which has a constant radius of curvature, comprises a marking tool including a marking head, a multi-axis movable arm assembly carrying the marking head, a sensor detecting a reference position of the product during a first movement of the movable arm assembly in which the movable arm assembly carrying the marking tool moves from a predetermined initial position to a marking start position, and producing a sensor signal when the reference position of the product is detected, a controller associated with the marking tool and the movable arm assembly for causing the first movement of the movable arm assembly, stopping the first movement in response to the sensor signal, deriving the relative position of the reference position of the product in relation to the initial position, deriving a marking start position on the basis of the derived reference position and a preset distance from the reference position of the product, causing a second movement of the movable arm to carry the marking heat to the marking start position, deriving a path through which to move the marking head on the basis of the marking start position and preset offsets from the marking start position, the path including a marking end position, causing a third movement by which the marking head moves along the path, activating the marking head to perform a marking operation in synchronism with the third movement, detecting when the marking head reaching the marking end position and then stopping the third movement, and causing a fourth movement of the movable arm by which the marking head is returned to the initial position.

According a yet further aspect of the invention, a device for marking a surface of a product comprises a marking tool including a marking head, an industrial robot having a movable arm assembly carrying the marking tool, a sensor detecting reference position of the product, and producing a sensor signal when the reference position is detected, first means for causing a first movement of the movable arm from a predetermined initial position separated from the product to be marked, the first movement of the movable arm including a period in which the marking tool moves toward the product along an axis parallel to the surface of the product on which a marking start position lies, second means for deriving a desired terminal position of the first movement opposing the marking start position relative to the position of the reference position of the product, third means stopping the first movement of the movable arm upon reaching the derived terminal position and holding the marking tool in opposition to the marking start position at a predetermined distance from the surface of the product, fourth means for deriving the path of a second movement of the movable arm in which the marking tool moves along the surface of the product on the basis of the terminal position of the first movement, which path includes a position at which a marking operation ends, fifth means for causing the second movement of the movable arm, sixth means for activating the marking tool to perform a marking operation in synchronism with the second movement of the movable arm, seventh means for detecting the movable arm reaches the marking end position and then stopping the second movement, and eighth means for causing a third movement by which the movable arm is returned to the initial position.

The sensor is separated from the marking tool, the distance between the sensor and the marking tool substantially corresponding to the predetermined distance between the reference position of the product and the marking start position.

The fourth means also derives the position of at least one intermediate point between the marking start position and the marking end position. The fourth means also derives the positions of a plurality of points between the marking start position and the intermediate point and between the intermediate point and the marking end position.

The path is so selected as to cause the second movement substantially follow the surface of the cylindrical pipe within a plane perpendicular to the longitudinal axis of the pipe. The path is essentially semi-circular.

BRIEF DESCRIPTION OF THE DRAWINGS

The present invention will be understood more fully more the detailed description given below and from the accompanying drawings of the preferred embodiment of the invention, which, however, should not be limited to the specific embodiment but are for explanation and understanding only.

In the drawings.

DESCRIPTION OF THE PREFERRED EMBODIMENT

Figure 1:
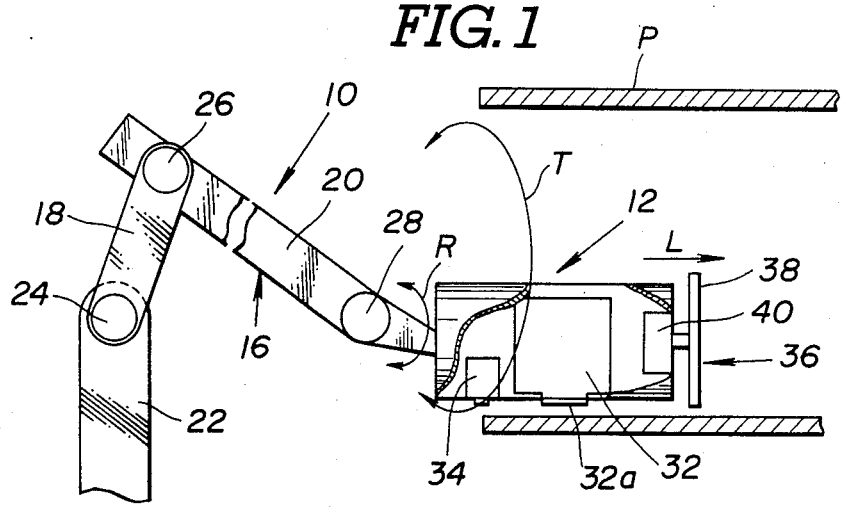
FIG. 1 is a diagram of part of the preferred embodiment of a marking device according to the present invention.
Figure 2:
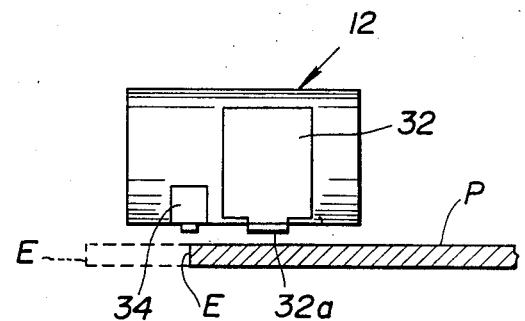
FIG. 2 is a diagram of the axial movement of a marking tool incorporated in the preferred embodiment of the marking device.
Figure 3:
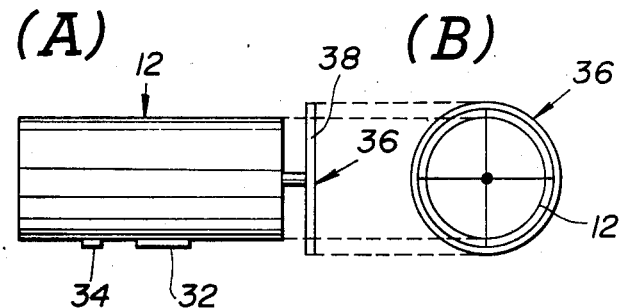
FIGS. 3(A) and 3(B) are side and front views respectively of the marking tool, showing the dimentional relationship between the main body of the marking device and a collision sensor attached to the main body of the marking device.

Referring now to the drawings, particularly to FIGS. 1 to 3, the preferred embodiment of a marking device, according to the present invention, comprises in part a multi-axis industrial robot 10. The robot 10 carries a marking tool 12 at its wrist 14. The wrist is mounted on the free end of a robot arm assembly 16 which comprises a first movable arm 18 and a second movable arm 20. The first movable arm 18 is pivotally connected to a base frame 22 via a first joint 24 which allows pivotal movement of the first arm relative to the base frame. A second joint 26 is provided between the first and second movable arms 18 and 20 for allowing relative pivotal displacement between the first and second movable arms. The second movable arm 20 supports the wrist 14 and the marking tool via a third joint 28.

As shown in FIG. 1, the third joint 28 allows rotation of the marking tool 12 about its longitudinal axis as indicated by the thick and solid arrow R. Also the third joint 28 allows pivotal movement of the wrist 14 with the marking tool 12 relative to the second movable arm 20. Similarly, the second joint 26 allows movement of the second movable arm 20 to move the marking tool 12 along the solid line T. Also, the second joint 26 allows pivotal movement of the second movable arm 20 relative to the first movable arm 18. The first joint 24 allows pivotal movement of the first movable arm 18 relative to the base frame.

Figure 4:
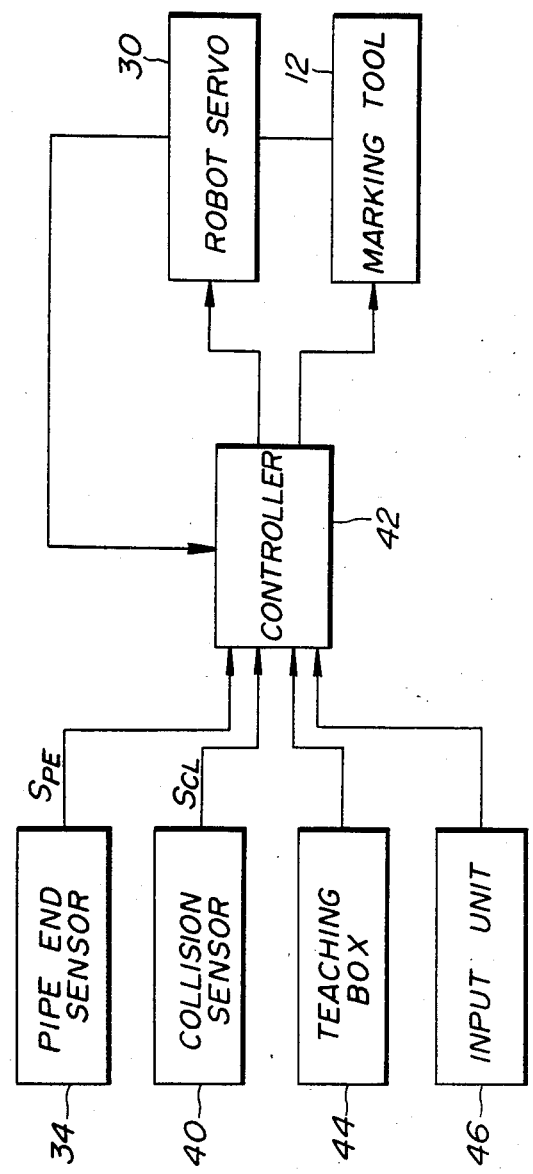
FIG. 4 is a schematic block diagram of the preferred embodiment of a control system for the marking device of FIGS. 1 to 3.

It should be noted that the construction of the instructial robot as set forth above is not essential to embody the present invention and any type of industrial robots capable of performing the necessary movements could be employed. Also, although it has not been clearly illustrated in FIGS. 1 to 3, each of the first, second and third joints 24, 26 and 28 are associated with a robot servo system which is shown in FIG. 4 and generally referred to by the reference numeral 30.

In the shown embodiment, with the arrangement of the movable arms 18 and 20 connected by way of the joints 24, 26 and 28, the marking tool 12 can be moved along the surface of a pipe P as indicated by the arrows R and T and along the longitudinal axis of the pipe P as indicated by the arrow L.

The marking tool 12 has a marking head 32 for applying predetermined marks, such as indications of type, kind, size, usage and so forth. The marking tool 12 also has a pipe end sensor 34 and a collision sensor 36.

Various printing or marking systems can be employed for the marking head 32. For example, the marking head can be a dot-matric marking head which ejects paint or ink by means of electromagnetic force. Such a dot-matrix-type marking head has been disclosed in Japanese Utility Model First Publication (Jikkai) Showa No. 58-145734, published on Sept. 30, 1983, Japanese Utility Model First Publication (Jikkai) Showa No. 58-128658, published on Aug. 31, 1983, and Japanese Utility Model First Publication (Jikkai) showa No. 59-67241, published on May 7, 1984. This dot-matrix type marking head could be advantgeously employed in the preferred embodiment of the marking device since it has some flexibility in selecting the character font to be printed and allows high-speed printing. In such case, the robot has to be controlled so as to hold the ink enjection nozzel 32a at right angles to the opposing surface or to its tangent.

The pipe and sensor 34 may include an optical sensor, a proximity switch, an ultra-sonic sensor or the like designed to detect the end E of the pipe P, as shown in FIG. 2. The pipe end sensor 34 outputs a first sensor signal $S_{PE}$ which goes HIGH when the end E of the pipe is detected. Alternatively, the first sensor signal $S_{PE}$ may remain HIGH while the pipe end sensor 34 opposes the surface of the pipe and goes LOW when the pipe end sensor 34 passes outside of the pipe.

The collision sensor assembly 36 comprises a disc-shape collision plate 38 and a sensor 40 designed to detect impacts involving the collision plate and in such cases, produce a second sensor signal $S_{CL}$. The sensor 40 may comprise a touch switch or a proximity switch which outputs the second sensor signal $S_{CL}$ when the collision plate 38 touches or collides with the end of surface of the pipe. Therefore, as shown in FIG. 3, the collision sensor assembly 36 is installed at the front end of the marking tool 12 and the collision plate 38 has a greater diameter than the main body of the marking tool.

The pipe end sensor 34 and the collision sensor 40 are connected to a controller 42 which controls the robot 10 to position the marking tool 12 at the desired marking position. The controller 42 is accordingly connected to the robot servo system 30 to supply a position control signal. The controller 42 is also connected for output to the marking tool 12 for controlling the marking operation.

In order to program the operation of the marking device, the controller 42 may be connected for input from a teaching box 44 and an input unit 46. The teaching box 44 is a per se well-known device designed to program movement of the movable arms 18 and 20 and the wrist 14, in this case, so as to position the marking tool 12 at the desired marking position, by manually operating the robot through the necessary movements. On the other hand, the input unit 46 may include a keyboard array for receiving entry of the characters to be printed on the surface of the pipe. Also, if desired, it would be possible to program the robot operation through the input unit in terms of the robot coordinate system.

Figure 7:
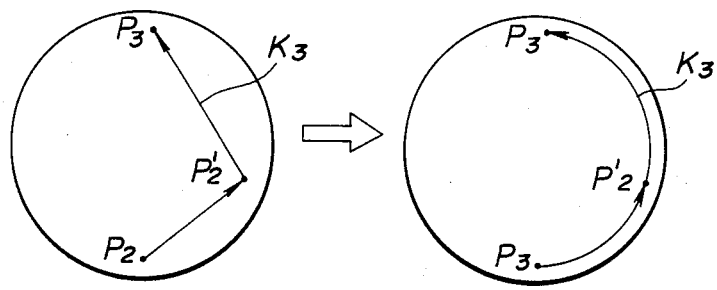
FIGS. 7(A) and 7(B) are diagrams showing interpolation between predetermined working positions.
Figure 8:
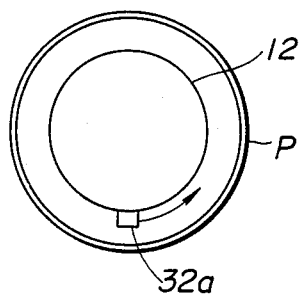
FIG. 8 is a cross-section through a pipe showing circumferential movement of the marking tool when a small-diameter pipe to be marked.

Operation of the aforementioned preferred embodiment of the marking device according to the present invention will be described herebelow with regard to marking a relatively large diameter pipe and a relatively small diameter pipe, respectively, with reference to FIGS. 6 to 8.

In either case, the movable arms 18 and 20 and the wrist 14 are operated by means of the servo system 30 by the position control signal from the controller 42, according to the operation program stored in the controller. First, the controller 42 moves the marking tool 12 to the end of the pipe P. After the marking tool 12 enters into the interior of the pipe, the pipe end sensor 34 moves into opposition with the end of the pipe.

Therefore, the first sensor signal $S_{PE}$ is generated by the pipe end sensor 34 and sent to the controller 42. The controller 42 is responsive to the first sensor signal $S_{PE}$ to stop the movable arms 18 and 20 and the wrist 14 and thus hold the marking tool 12 in place.

Therefore, the distance between the marking head 32 and the pipe end sensor 34 is so selected as to correspond to the desired distance of the marking position from the pipe end.

Figure 5:
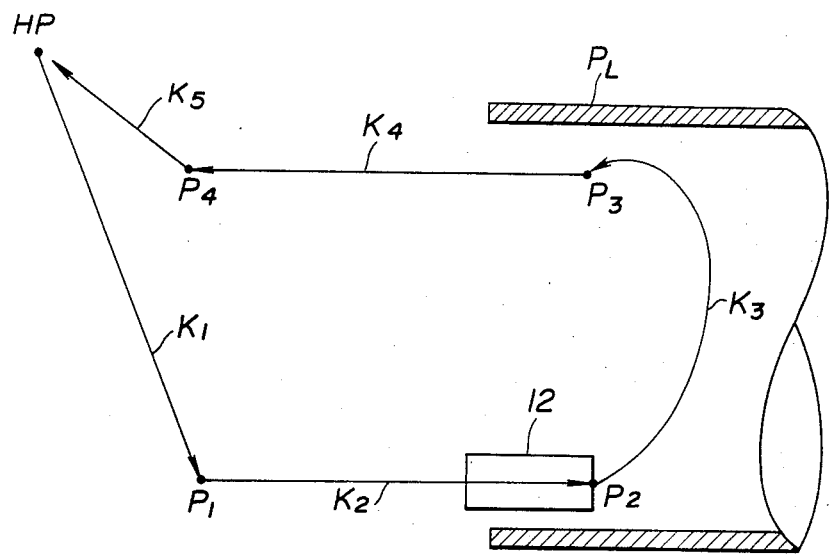
FIG. 5 shows the path of movement of the marking tool according to the preferred embodiment of the invention, as controlled by the control system of FIG. 4.

In practice, as shown in FIG. 5, the marking tool 12 is initially at a point HP and when is moved to the point $P_1$ at which the marking tool lies at a raidal position of the pipe suitable to start marking, along the path $K_1$. At the point $P_1$, the marking tool 12 is converted to axial movement, i.e. parallel to the longitudinal axis of the large-diameter pipe $P_L$ along the arrow $K_2$. At the point $P_2$, the pipe end sensor 34 detects the end of the pipe $P_L$ and thus the first sensor signal $S_{PE}$ is produced. Thus, the movement of the marking tool 12 along the arrow $K_2$ is terminated.

After stopping the axial movement of the marking tool 12 along the arrow $K_2$, and in response to the first sensor signal $S_{PE}$ from the pipe end sensor 34, the controller outputs a marking control signal $S_{MK}$ for the marking tool 12 to activate the latter. At the same time, the controller outputs the position control signal to swivel the second movable arm 20 relative to the second joint 36 so as to move the marking tool 12 along the inner surface of the large-diameter pipe $P_L$, as shown by arrow $K_3$ in FIGS. 5 and 6.

Therefore, the point $P_2$ represents the initial marking position at which the marking operation starts. The marking tool 12 follows the path $K_3$ along the inner surface of the pipe $P_L$ to the point $P_3$ which represents the marking end point at which the marking operation ends.

It should be noted that the point $P_2$ is not fixed relative to the initial position HP. Therefore, it is not possible to preset by means of the teaching box 44 the robot operation by which the marking tool 12 is moved along the arrow $K_3$. In order to enable derivation of the robot operation coordinates during marking operation and to move the marking tool 12 along the arrow $K_3$ starting from the variable initial marking point $P_2$, the shown embodiment uses an incremental process and interpolation process.

Figure 6:
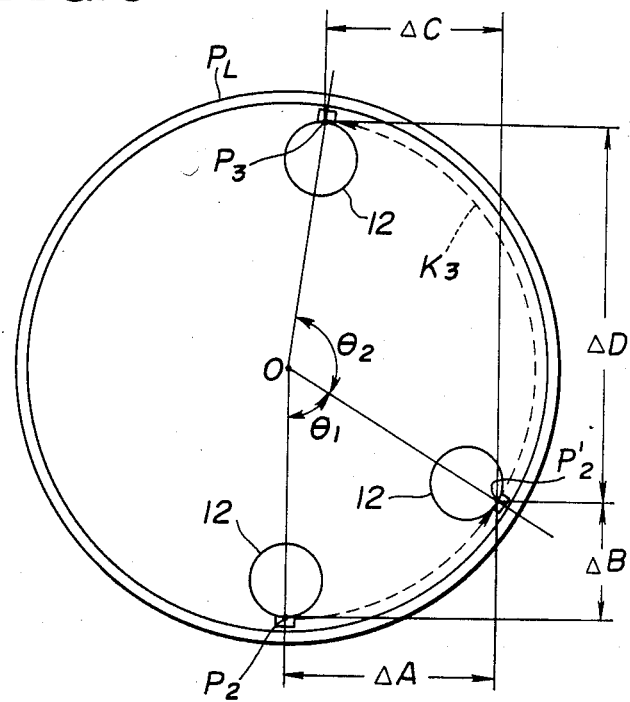
FIG. 6 is a cross-section through a pipe showing circumferential movement of the marking tool.

As shown in FIG. 6, when presetting the programming for the robot operation, parameters $\theta_1$ and $\theta_2$ are set through the input unit 46. $\Delta A$, $\Delta B$, $\Delta C$ and $\Delta D$ in FIG. 6 are parameters respectively indicative of horizontal and vertical offsets of the marking tool over two angular movements, and $\theta_1$ and $\theta_2$ are representative of the angular shift of the marking tool 12 corresponding to horizontal and vertical offsets $\Delta A$, $\Delta B$, $\Delta C$ and $\Delta D$. These parameters vary depending on the pipe size, the number of characters to be marked on the inner surface of the pipe and so forth.

Based on the present horizontal shaft $\Delta A$ and vertical shift $\Delta B$, the preset shift angle $\theta_1$ and the coordinates of the point $P_2$ in the robot coordinate system, the controller 42 derives an intermediate point $P_2'$. Similarly, based on the preset horizontal shift $\Delta C$ and vertical shift $\Delta D$, the preset shift angle $\theta_2$ and the coordinates of the point $P_2'$ in the robot coordinate system, the controller 42 derives the marking end point $P_3$. Also, the controller 42 derives the coordinates of the center O of the circle of the pipe based on the given parammeters $\Delta A$, $\Delta B$, $\Delta C$, $\Delta D$, $\theta_1$ and $\theta_2$ and the coordinates of the points $P_2$, $P_2'$ and $P_3$. The controller 42 further performs interpolation to derive intermediate points coordinates so as to move the marking tool 12 along the arrow $K_3$, as shown in FIG. 7(B).

In the case of a marking operation on a small-diameter pipe, the movement of the second movable arm 20 so as to trace the marking tool 12 along the inner surface of the pipe as indicated by the arrow $K_3$, becomes unnecessary. In this case, as shown in FIG. 8, the wrist 14 can be simply rotated to actuate the marking tool 12.

Figure 9:
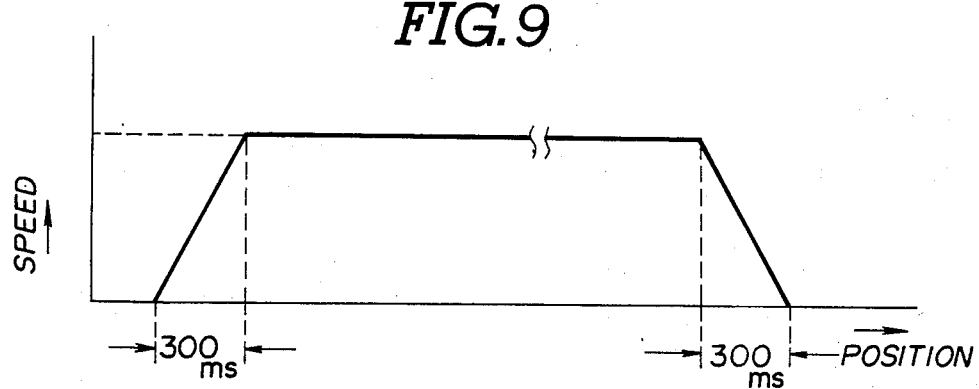
FIG. 9 is a chart of the motion speed of the marking device.

In the preferred embodiment, the servo system 30 is selected to have relatively short acceleration and deceleration periods. FIG. 9 shows the rate of movement of the servo-controlled head. As will be appreciated herefrom, the servo system employed in the shown embodiment takes approximately 300 msec to reach its cruising speed and to decelerate from cruising speed to rest. Therefore, by appropriately controlling start and stop timing of ink ejection to avoid the acceleration and deceleration period, time-base control of the marking tool operation becomes possible. Therefore, according to the shown embodiment, a position sensor, such as an encoder, for monitoring the position of the marking head 32 while in operation, is not required.

Although the foregoing disclosure of the operation of the preferred embodiment of the marking device according to the invention has been given with respect to marking the inner surface of the pipe, it would be possible to mark the outer surface of a pipe as well. Even in this case, marking operation can be performed with higher efficiency than in conventional processes. Furthermore, the marking device according to the present invention is applicable to marking not only pipe but also on plate stock or other various forms of products.

It would be also advisable that, in a computer-controlled pipe manufacturing line, the type, size and other information to be marked on the pipe surface be stored in the computer controlling the manufacturing line. Therefore, by cooperation between the controller of the marking device and the line-controlling controller, the information to be marked can be conveniently obtained.

While the present invention has been disclosed in terms of the preferred embodiment of the invention in order to facilitate full understanding of the invention, the invention should not be understood as being limited to the specific embodiment shown above. Therefore, the invention should be interpreted to include all possible embodiments and modifications of the shown embodiment which do not depart from the principles of the invention, which are set out in the appended claims.

What is claimed is:

1. A method for applying marks to the surface of a hollow product with a constant radius of curvature, comprising the steps of:

mounting a marking head of the motile end of a multi-axis movable arm assembly;

mounting a sensor on said motile end of said movable arm assembly;

causing a first movement of said movable arm assembly carrying said marking head from a predetermined initial position toward said product;

detecting a reference position of said product during said first movement of said movable arm assembly by means of said sensor which reference position is set at a predetermined distance from a marking start position which is determined in relation to the distance between said marking head and said sensor;

deriving the position of said reference position of said product relative to said initial position;

deriving a marking start position on the basis of the derived reference position and a preset distance from said reference position of said product;

causing a second movement of said movable arm to carry said marking head to said marking start position;

deriving a path through which to move said marking head on the basis of said marking start position and preset offsets from said marking station position, said path including a marking end position;

causing a third movement to move said marking head along said path;

activating said marking head to perform a marking operation in synchronism with said third movement;

detecting when said marking head reaches said marking end position and then stopping said third movement; and causing a fourth movement of said movable arm to return said marking head to said initial position.

2. The method as set forth in claim 1, wherein said marking operation applies a mark to the inner surface of said product.

3. The method as set forth in claim 1, wherein said marking operation applies a mark to the outer surface of said product.

4. A process for applying a mark to a surface of a product comprising the steps of:

installing a marking tool including a marking head on a movable arm of an industrial robot;

causing a first movement of said movable arm from a predetermined initial position separated from said product to be marked, said first movement of said movable arm including a period in which said marking tool moves toward said product along an axis parallel to the surface of the product on which a marking start position lies;

detecting a reference position of said product by means of a sensor provided in such a manner that said sensor is positioned away from said marking tool, the distance between said sensor and said marking tool substantially corresponding to said predetermined distance between said reference position of said product and said marking start position;

deriving a desired terminal position of said first movement opposing said marking start position relative to the position of said reference position of said product;

stopping said first movement of said movable arm upon reaching said derived terminal position and holding said marking tool in opposition to said marking start position at a predetermined distance from said surface of the product;

deriving the path of a second movement of said movable arm in which said marking tool moves along the surface of the product on the basis of the terminal position of said first movement, which path includes a position at which a marking operation ends;

causing said second movement of said movable arm;

activating said marking tool to perform a marking operation in synchronism with said second movement of said movable arm;

detecting when said movable arm reaches said marking end position and then stopping said second movement; and causing a third movement by which said movable arm is returned to said initial position.

5. The process as set forth in claim 4, wherein said marking operation applies a mark to the inner surface of a hollow product.

6. The process as set forth in claim 5, wherein said hollow product is a cylindrical pipe.

7. The process as set forth in claim 6, wheein said step of deriving said path for said second movement includes the step of deriving the position of at least one intermediate point between said marking start position and said marking end position.

8. The process as set forth in claim 7, wherein said step of deriving said path for said second movement includes the step of deriving the positions of a plurality of points between said marking start position and said intermediate point and between said intermediate point and said marking end position.

9. The process as set forth in claim 8, wherein said path is so selected as to cause said second movement substantially to follow the surface of said cylindrical pipe within a plane perpendicular to the longitudinal axis of the pipe.

10. The process as set forth in claim 9, wherein said path is essentially semi-circular.

11. The process as set forth in claim 7, wherein said intermediate point is preselected by presetting vertical and horizontal offsets from said marking start position.

12. The process as set forth in claim 7, wherein said marking end position is preselected by presetting vertical and horizontal offsets from said marking start position.

13. The process as set forth in claim 11, wherein said marking end position is preselected by presetting vertical and horizontal offsets from said intermediate point.

14. A method for applying marking to the surface of a hollow product with a constant radius of curvature, comprising the steps of:

mounting a marking head on the motile end of a multi-axis movable arm assembly with a predetermined distance from mating periphery of said hollow product;

mounting a first sensor for detecting a predetermined reference position in relation to said hollow product;

mounting a second sensor for detecting said marking head position relative to said mating periphery of said hollow product;

detecting said reference position by means of said first sensor during said first movement of said movable arm assembly;

causing a first movement of said movable arm assembly carrying said marking head from a predetermined initial position toward said product;

deriving the position of said reference position relative to said initial position;

deriving a marking start position on the basis of the derived reference position and a preset distance from said reference position;

causing second movement of said movable arm to carry said marking head to said marking start position;

deriving a path through which to move said marking head on the basis of said marking start position and preset offsets from said marking start position, said path including a marking end position;

causing a third movement to move said marking head along said path;

activating said marking head to perform a marking operation in synchronism with said third movement;

detecting when said marking head reaches said marking end position and then stopping said third movement;

causing fourth movement of said movable arm to return said marking head to said initial position; and detecting said marking head radially shifting toward said periphery of said hollow product to reduce the distance to said mating periphery smaller than said predetermined distance by means of said second sensor stop movement of said arm.

15. A device for applying marks to a surface of a hollow product which has a constant radius of curvature, comprising:

a marking tool including a marking head;

a multi-axis movable arm assembly carrying said marking head;

a sensor detecting a reference position of said product during a first movement of said movable arm assembly in which said movable arm assembly carrying said marking tool moves from a predetermined initial position to a marking start position, and producing a sensor signal when said reference position of the product is detected, said sensor being positioned at a given distance from said marking head, which given distance is set in relation to a distance between said reference position and a marking start position;

a controller associated with said marking tool and said movable arm assembly for causing said first movement of said movable arm assembly, stopping said first movement in response to said sensor signal, deriving the relative position of said reference position of said product in relation to said initial position, deriving said marking start position on the basis of the derived reference position and a preset distance from said reference position of said product, causing a second movement of said movable arm to carry said marking head to said marking start position, deriving a path through which to move said marking head on the basis of said marking start position and preset offsets from said marking start position, said path including a marking end position, causing a third movement by which said marking head moves along said path, activating said marking head to perform a marking operation in synchronism with said third movement, detecting when said marking head reaches said marking end position and then stopping said third movement, and causing a fourth movement of said movable arm by which said marking head is returned to said initial position.

16. The device as set forth in claim 15, wherein said marking operation applies a mark to the inner surface of said product.

17. The device as set forth in claim 15, wherein said marking operation applies a mark to the outer surface of said product.

18. A device for marking a surface of a product comprising:

a marking tool including a marking head;

an industrial robot having a movable arm assembly carrying said marking tool;

a sensor detecting a reference position of said product, and producing a sensor signal when the reference position is detected and said sensor is separated from said marking tool, the distance between said sensor and said marking tool substantially corresponding to said predetermined distance between said reference position of said product and said marking start position;

first means for causing a first movement of said movable arm from a predetermined initial position separated from said product to be marked, said first movement of said movable arm including a period in which said marking tool moves toward said product along an axis parallel to the surface of the product on which a marking start position lies;

second means for deriving a desired terminal position of said first movement opposing said marking start position relative to the position of said reference position of said product;

third means stopping said first movement of said movable arm upon reaching said derived terminal position and holding said marking tool in opposition to said marking start position at a predetermined distance from said surface of the product;

fourth means for deriving the path of a second movement of said movable arm in which said marking tool moves along the surface of the product on the basis of the terminal position of said first movement, which path includes a position at which a marking operation ends;

fifth means for causing said second movement of said movable arm;

sixth means for activating said marking tool to perform a marking operation in synchronism with said second movement of said movable arm;

seventh means for detecting when said movable arm reaches said marking end position and then stopping said second movement; and eighth means for causing a third movement by which said movable arm is returned to said initial position.

19. The device as set forth in claim 18, wherein said marking operation applies a mark to the inner surface of a hollow product.

20. The device as set forth in claim 19, wherein said hollow product is a cylindrical pipe.

21. The device as set forth in claim 20, wherein said fourth means also derives the position of at least one intermediate point between said marking start position and said marking end position.

22. The device as set forth in claim 21, wherein said fourth means also derives the positions of a plurality of points between said marking start position and said intermediate point and between said intermediate point and said marking end position.

23. The device as set forth in claim 22, wherein said path is so selected as to cause said second movement substantially follow the surface of said cylindrical pipe within a plane perpendicular to the longitudinal axis of the pipe.

24. The device as set forth in claim 23, wherein said trace is essentially semi-circular.

25. The device as set forth in claim 24, wherein said intermediate point is preselected by presetting vertical and horizontal offsets from said marking start position.

26. The device as set forth in claim 21, wherein said marking end position is preselected by presetting vertical and horizontal offsets from said marking start position.

27. The device as set forth in claim 25, wherein said marking end position is preselected by presetting vertical and horizontal offsets from said intermediate point.

28. A device for applying marks to a surface of a hollow product which has a constant radius or curvature, comprising:
   a marking tool including a marking head;
   a multi-axis movable arm assembly carrying said marking head;
   a first sensor detecting a reference position of said product during a first movement of said movable arm assembly in which said movable arm assembly carrying said marking tool moves from a predetermined initial position to a marking start position, and producing a first sensor signal when said reference position of the product is detected;
   a second sensor detecting radial position of said marking head relative to the mating periphery of said hollow product to produce a second sensor signal when the distance between said marking head and said mating periphery is shorter than a given value;
   a controller associated with said marking tool and said movable arm assembly for causing said first movement of said movable arm assembly, stopping said first movement in response to said sensor signal, deriving the relative position of said reference position of said product in relation to said initial position, deriving said marking start position on the basis of the derived reference position and a preset distance from said reference of said product, causing a second movement of said movable arm to carry said marking head to said marking start position, deriving a path through which to move said marking head on the basis of said marking start position and preset offsets from said marking start position, said path including a marking end position, causing a third movement by which said marking head moves along said path, activating said marking head to perform a marking operation in synchronism with said third movement, detecting when said marking head reaches said marking end position and then stopping said third movement, and causing a fourth movement of said movable arm by which said marking head is returned to said initial position, said controller being further responsive to said second sensor signal to stop movement of said movable arm regardless of the position of said movable arm.

* * * * *

UNITED STATES PATENT AND TRADEMARK OFFICE
CERTIFICATE OF CORRECTION

PATENT NO. : 4,682,182
DATED : July 21, 1987
INVENTOR(S) : Akihiro Oyama, et al

It is certified that error appears in the above-identified patent and that said Letters Patent is hereby corrected as shown below:

On the title page assignee should read

-- (73) Assignees: Kawasaki Steel Corporation, Tokyo, Japan and Marktec Corporation, Tokyo, Japan --.

Signed and Sealed this

First Day of March, 1988

Attest:

DONALD J. QUIGG

*Attesting Officer*  *Commissioner of Patents and Trademarks*